United States Patent
Fu et al.

(10) Patent No.: US 12,200,742 B2
(45) Date of Patent: Jan. 14, 2025

(54) WIRELESS COMMUNICATION METHOD AND APPARATUS, AND COMMUNICATION DEVICE

(71) Applicant: GUANGDONG OPPO MOBILE TELECOMMUNICATIONS CORP., LTD., Guangdong (CN)

(72) Inventors: Zhe Fu, Guangdong (CN); Jing Xu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 394 days.

(21) Appl. No.: 17/680,018

(22) Filed: Feb. 24, 2022

(65) Prior Publication Data

US 2022/0256544 A1    Aug. 11, 2022

Related U.S. Application Data

(63) Continuation of application No. PCT/CN2019/110887, filed on Oct. 12, 2019.

(51) Int. Cl.
*H04W 72/04* (2023.01)
*H04W 72/0446* (2023.01)
(Continued)

(52) U.S. Cl.
CPC ....... *H04W 72/53* (2023.01); *H04W 72/0446* (2013.01); *H04W 72/21* (2023.01)

(58) Field of Classification Search
CPC ..... H04W 72/04; H04W 72/02; H04W 72/12; H04W 72/20; H04W 72/23; H04W 72/51; H04W 74/08; H04W 74/00; H04W 76/14; H04W 76/27; H04W 76/30; H04W 92/18; H04W 4/08; H04W 8/00; H04W 24/10;
(Continued)

(56) References Cited

U.S. PATENT DOCUMENTS 9,661,617 B2 * 5/2017 Dai .................. H04W 72/00
9,801,171 B2 * 10/2017 Kim .................. H04L 5/0048
(Continued)

FOREIGN PATENT DOCUMENTS

CN    106160988 A    11/2016
CN    113661749 A    11/2021
(Continued)

OTHER PUBLICATIONS

Ericsson, UCI Enhancements for NR URLLC, 3GPP TSG RAN WG1 Meeting #98bis, R1-1910546, Oct. 14-20, 2019. (8 pages).
(Continued)

*Primary Examiner* — Man U Phan
(74) *Attorney, Agent, or Firm* — Young Basile Hanlon & MacFarlane, P.C.

(57) ABSTRACT

A wireless communication method and apparatus, and a communication device are provided. The method includes the following. A network device transmits first information to a terminal device, where the first information is used for indicating a physical uplink control channel (PUCCH) resource configured in a first slot, the first slot includes multiple sub-slots, and the first information includes a starting offset of the PUCCH resource relative to a boundary of the sub-slot.

17 Claims, 6 Drawing Sheets

(51) Int. Cl.
*H04W 72/21* (2023.01)
*H04W 72/53* (2023.01)

(58) Field of Classification Search
CPC ..... H04W 36/34; H04W 28/20; H04W 40/24; H04L 5/00; H04L 5/14; H04L 27/26
USPC ......................................................... 370/329
See application file for complete search history.

(56) References Cited

U.S. PATENT DOCUMENTS

| | | | | |
|---|---|---|---|---|
| 10,341,998 | B2 * | 7/2019 | Nogami | H04W 72/23 |
| 10,516,517 | B2 * | 12/2019 | Xiong | H04L 5/0053 |
| 11,848,884 | B2 * | 12/2023 | Xiong | H04L 5/0053 |
| 2016/0057769 | A1 * | 2/2016 | Chatterjee | H04L 65/403 |
| | | | | 370/328 |
| 2019/0199468 | A1 | 6/2019 | Zhao et al. | |
| 2020/0351891 | A1 * | 11/2020 | Hosseini | H04W 72/53 |
| 2022/0109531 | A1 * | 4/2022 | Yin | H04L 1/1861 |
| 2022/0217678 | A1 * | 7/2022 | Yoshioka | H04W 72/02 |
| 2022/0248395 | A1 * | 8/2022 | Andersson | H04L 5/0055 |
| 2022/0279483 | A1 * | 9/2022 | Gao | H04W 72/0446 |
| 2022/0294575 | A1 * | 9/2022 | Park | H04W 72/1273 |
| 2023/0262712 | A1 * | 8/2023 | Park | H04W 72/23 |
| | | | | 370/336 |

FOREIGN PATENT DOCUMENTS

| | | | |
|---|---|---|---|
| WO | 2014000421 | A1 | 1/2014 |
| WO | 2020145355 | A1 | 7/2020 |

OTHER PUBLICATIONS

Apple Inc., On UCI enhancements for NR URLLC, 3GPP TSG-RAN WG1 #98, R1-1909055, Aug. 26-30, 2019. (4 pages).
Sony, UCI Enhancements for URLLC, 3GPP TSG RAN WG1 #98bis, R1-1910769, Oct. 14-20, 2019. (10 pages).
3GPP TS 38.21 3 V15.7.0 (Sep. 2019); Technical Specification Group Radio Access Network; NR; Physical layer procedures for control (Release 15). (108 pages).
Extended European Search Report for EP Application 19948376.9 mailed Jun. 20, 2022. (13 pages).
Chinese First Office Action with English Translation for CN Application 202210050848.X mailed Mar. 3, 2023. (17 pages).
3GPP TSG-RAN2 Meeting #99bis Prague, Czech Republic, R2-1710499, Running CR for introduction of shortened TTI and processing time for LTE, Ericsson, Oct. 9-13, 2017. (64 pages).
3GPP TS 38.331 V16.2.0 (Sep. 2020), Radio Resource Control (RRC) protocol specification (Release 16), 921 pages.
3GPP TS 38.213 V16.3.0 (Sep. 2020), Physical layer procedures for control (Release 16), 179 pages.
International Search Report with English Translation for PCT Application PCT/CN2019/110887 mailed Jun. 23, 2020. (11 pages).
3GPP TSG RAN WG1 #98bis Chongqing, China, R1-1910661, Intel Corporation, UCI enhancements for eURLLC, Oct. 14-20, 2019. (15 pages).

* cited by examiner

300

TRANSMIT, BY A NETWORK DEVICE, FIRST INFORMATION TO A TERMINAL DEVICE, WHERE THE FIRST INFORMATION IS USED FOR INDICATING A PUCCH RESOURCE CONFIGURED IN A FIRST SLOT, THE FIRST SLOT INCLUDES MULTIPLE SUB-SLOTS, AND THE FIRST INFORMATION INCLUDES A STARTING OFFSET OF THE PUCCH RESOURCE RELATIVE TO A BOUNDARY OF THE SUB-SLOT ~ 310

WIRELESS COMMUNICATION METHOD AND APPARATUS, AND COMMUNICATION DEVICE

CROSS-REFERENCE TO RELATED APPLICATION(S)

This application is a continuation of International Application No. PCT/CN2019/110887, filed on Oct. 12, 2019, the entire disclosure of which is incorporated herein by reference.

TECHNICAL FIELD

This disclosure relates to the field of communication, and more particularly to a wireless communication method and apparatus, and a communication device.

BACKGROUND

At present, in order to support ultra-reliable and low latency communication (URLLC) services, a concept of sub-slot has been introduced. For configuration of the sub-slot introduced, when configuring physical uplink control channel (PUCCH) resources, one way is PUCCH resource configuration with slots as boundaries, and the other way is PUCCH resource configuration with sub-slots as boundaries.

In terms of PUCCH resource configuration with sub-slots as boundaries, there may be two ways. One way is to configure a corresponding PUCCH resource for each sub-slot, where one sub-slot has a unique identity (ID). However, this way may lead to a great deal of radio resource control (RRC) signaling overhead. The other way is to uniformly configure a PUCCH resource for all sub-slot IDs. Although this way can save RRC signaling overhead, the PUCCH resource configured is low in flexibility due to uniform PUCCH resource configuration for all sub-slots.

Therefore, when configuring PUCCH resources, how to ensure flexibility in PUCCH resource configuration while avoiding large RRC signaling overhead is a problem to be solved.

SUMMARY

In a first aspect, a wireless communication method is provided. The method includes the following. A network device transmits first information to a terminal device, where the first information is used for indicating a PUCCH resource configured in a first slot, the first slot includes multiple sub-slots, and the first information includes a starting offset of the PUCCH resource relative to a boundary of at least one sub-slot among the plurality of sub-slots.

In a second aspect, a wireless communication method is provided. The method includes the following. A terminal device receives first information transmitted by a network device, where the first information is used for indicating at least one PUCCH resource configured in a first slot, the first slot includes multiple sub-slots, and the first information includes a starting offset of the PUCCH resource relative to a boundary of at least one sub-slot among the plurality of sub-slots. The terminal device determines a PUCCH resource in at least one sub-slot among the multiple sub-slots from the at least one PUCCH resource according to the first information.

In a third aspect, a wireless communication apparatus is provided. The wireless communication apparatus includes a transceiver, a processor, and a memory storing computer programs. The computer programs, when executed by the processor, are operable with the transceiver to receive first information transmitted by a network device, where the first information is used for indicating at least one PUCCH resource configured in a first slot, the first slot includes multiple sub-slots, and the first information includes a starting offset of the PUCCH resource relative to a boundary of at least one sub-slot among the plurality of sub-slots. The computer programs, when executed by the processor, are operable with the processor to determine a PUCCH resource in at least one sub-slot among the multiple sub-slots from the PUCCH resource according to the first information.

DETAILED DESCRIPTION

The following will describe technical solutions of implementations of the disclosure clearly and comprehensively with reference to the accompanying drawings. Apparently, implementations described herein are merely some implementations, rather than all implementations, of the disclosure. Based on the implementations of the disclosure, all other implementations obtained by those of ordinary skill in the art without creative effort shall fall within the protection scope of the disclosure.

The technical solutions of implementations of the disclosure are applicable to various communication systems, for example, a global system of mobile communication (GSM), a code division multiple access (CDMA) system, a wideband code division multiple access (WCDMA) system, a general packet radio service (GPRS) system, a long term evolution (LTE) system, an LTE frequency division duplex (LTE-FDD) system, an LTE time division duplex (LTE-TDD) system, a universal mobile telecommunication system (UMTS), a worldwide interoperability for microwave access (WiMAX) communication system, a $5^{th}$ generation (5G) system, or the like.

Figure 1:
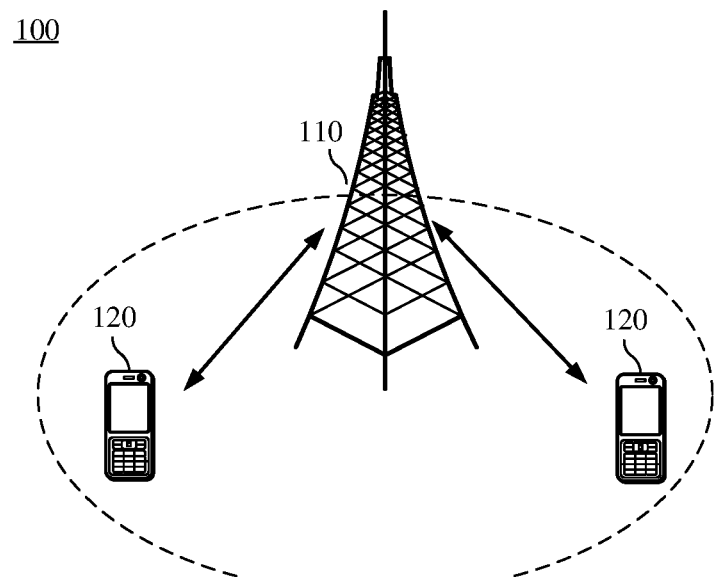
FIG. 1 is a schematic architectural diagram of a communication system provided in implementations of the disclosure.

FIG. 1 illustrates a communication system 100 of implementations of the disclosure. The communication system 100 may include a network device 110. The network device 110 may be a device that communicates with a terminal device 120 (also referred to as a communication terminal or a terminal). The network device 110 can provide a communication coverage for a specific geographical area and communicate with terminal devices in the coverage area. The network device 110 may be a base transceiver station (BTS) in the GSM or in the CDMA system, or may be a NodeB (NB) in the WCDMA system, or may be an evolutional Node B (eNB or eNodeB) in the LTE system, or a radio controller in a cloud radio access network (CRAN). Alternatively, the network device may be a mobile switching center, a relay station, an access point, an in-vehicle device, a wearable device, a hub, a switch, a bridge, a router, a network-side device in a 5G network, or a network device in a future evolved public land mobile network (PLMN).

The communication system 100 further includes at least one terminal device 120 in a coverage area of the network device 110. The "terminal device" referred to herein can include but is not limited to a device configured to communicate via a wired line, another data connection/network, a wireless interface, a device which is part of another terminal device and configured to receive/transmit communication signals, and/or an Internet of things (IoT) device. Examples of the wired line may include, but are not limited to, a public switched telephone network (PSTN), a digital subscriber line (DSL), a digital cable, and a direct connection cable. Examples of the wireless interface may include, but are not limited to, a wireless interface for a cellular network, a wireless local area network (WLAN), a digital television network (such as a digital video broadcasting-handheld (DVB-H) network), a satellite network, and an amplitude modulation-frequency modulation (AM-FM) broadcast transmitter. A terminal device configured to communicate via a wireless interface may be called a "wireless communication terminal", a "wireless terminal", or a "mobile terminal". Examples of the mobile terminal may include, but are not limited to, a satellite telephone or cellular telephone, a personal communication system (PCS) terminal integrated with functions of cellular radio telephone, data processing, fax, and/or data communication, a personal digital assistant (PDA) equipped with radio telephone, pager, Internet/Intranet access, web browsing, notebook, calendar, and/or global positioning system (GPS) receiver, and/or a conventional laptop, a handheld receiver, or other electronic devices equipped with radio telephone transceiver. The terminal device may refer to an access terminal, a user equipment (UE), a subscriber unit, a subscriber station, a mobile station, a remote station, a remote terminal, a mobile device, a user terminal, a terminal, a wireless communication device, a user agent, or a user device. The access terminal may be a cellular radio telephone, a cordless telephone, a session initiation protocol (SIP) telephone, a wireless local loop (WLL) station, a PDA, a handheld device with wireless communication functions, a computing device, other processing devices coupled with a wireless modem, an in-vehicle device, a wearable device, a terminal device in a 5G network, a terminal device in the future evolved PLMN, etc.

Optionally, terminal device(s) 120 can communicate with each other through device to device (D2D) communication.

Optionally, the 5G system or 5G network can also be referred to as a new radio (NR) system or NR network.

FIG. 1 exemplarily illustrates one network device and two terminal devices. The communication system 100 may also include multiple network devices, and there can be other numbers of terminal devices in a coverage area of each of the network devices, which is not limited herein.

Optionally, the communication system 100 may further include other network entities such as a network controller, a mobile management entity, or the like, and the disclosure is not limited in this regard.

It should be understood that, in implementations of the disclosure, a device with communication functions in a network/system can be referred to as a "communication device". Taking the communication system 100 illustrated in FIG. 1 as an example, the communication device may include the network device 110 and the terminal device(s) 120 that have communication functions. The network device 110 and the terminal device(s) 120 can be the devices described above and will not be repeated herein. The communication device may further include other devices such as a network controller, a mobile management entity, or other network entities in the communication system 100, and implementations of the disclosure are not limited in this regard.

It should be understood that, the terms "system" and "network" herein are usually used interchangeably throughout this disclosure. The term "and/or" herein only describes an association relationship between associated objects, which means that there can be three relationships. For example, A and/or B can mean A alone, both A and B exist, and B alone. In addition, the character "/" herein, unless otherwise specified, generally indicates that the associated objects are in an "or" relationship.

For better understanding of the disclosure, the following will first give a brief introduction to a physical uplink control channel (PUCCH) resource as well as PUCCH resource configuration.

In general, one or more PUCCH resources can be supported in one slot. When configuring PUCCH resources, a base station may configure based on PUCCH resource sets, or may configure based on PUCCH resources. For each PUCCH resource set, a PUCCH resource set identity (ID) corresponding thereto and at least one PUCCH resource may be configured. For each PUCCH resource, a PUCCH resource ID corresponding thereto and a specific PUCCH resource may be configured.

The specific PUCCH resource may be configured according to a PUCCH format. When configuring a PUCCH format, a length of the PUCCH resource and an offset of the PUCCH resource relative to a reference point (that is, starting symbol index) may be indicated. Difference between various PUCCH formats lies in different lengths and/or different sizes of information carried. For a configured PUCCH resource, a boundary (that is, left boundary and/or lower boundary) of each slot is a reference point of the PUCCH resource relative to an offset. Each PUCCH resource configured by the base station may be located in any slot and cannot exceed a boundary of the slot.

At present, in order to support ultra-reliable and low latency communication (URLLC) services, a concept of sub-slot has been introduced, that is, one slot may be divided into multiple sub-slots. One slot generally can include 2 or 7 sub-slots, and accordingly, a duration of each sub-slot may be 7 symbols or 2 symbols (under a normal cyclic prefix (NCP)). For configuration of the sub-slot introduced, when configuring PUCCH resources, one way is PUCCH resource configuration with slots as boundaries, and the other way is PUCCH resource configuration with sub-slots as boundaries.

Figure 2A:
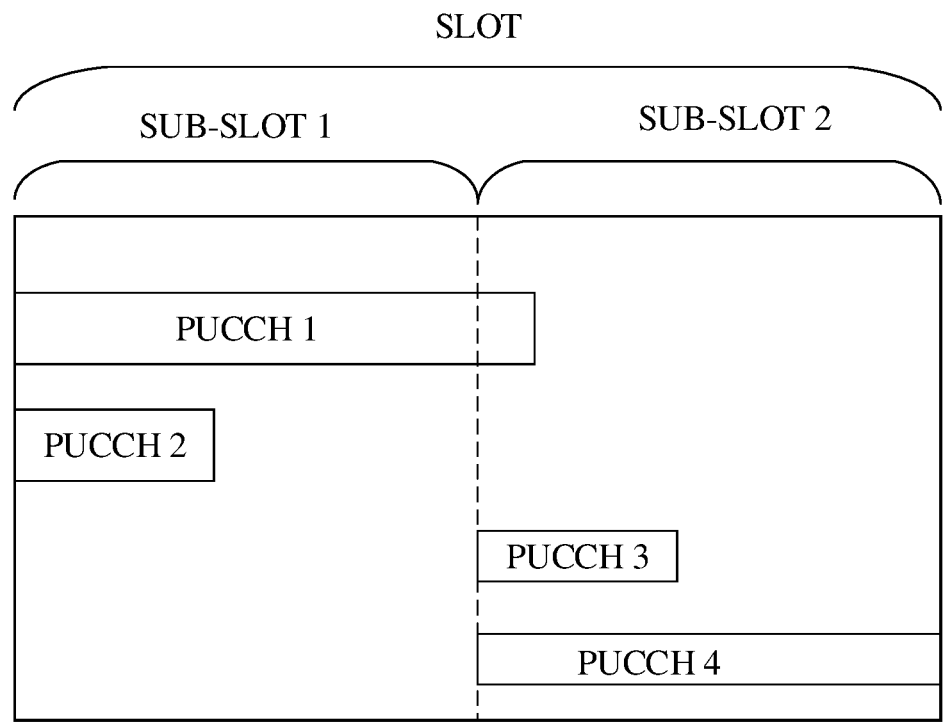
FIG. 2a is a schematic diagram illustrating physical uplink control channel (PUCCH) resource configuration for sub-slots provided in implementations of the disclosure.

In terms of PUCCH resource configuration with sub-slots as boundaries, there may be two ways. As illustrated in FIG. 2a, a corresponding PUCCH resource may be configured for each sub-slot ID, and each sub-slot may have a different PUCCH resource configuration. For example, PUCCH 1 resource and PUCCH 2 resource may be configured in sub-slot 1, and PUCCH 3 resource and PUCCH 4 resource may be configured in sub-slot 2. Each PUCCH resource configured cannot exceed a boundary of a slot to which the sub-slot belongs.

Figures 2B, 3:
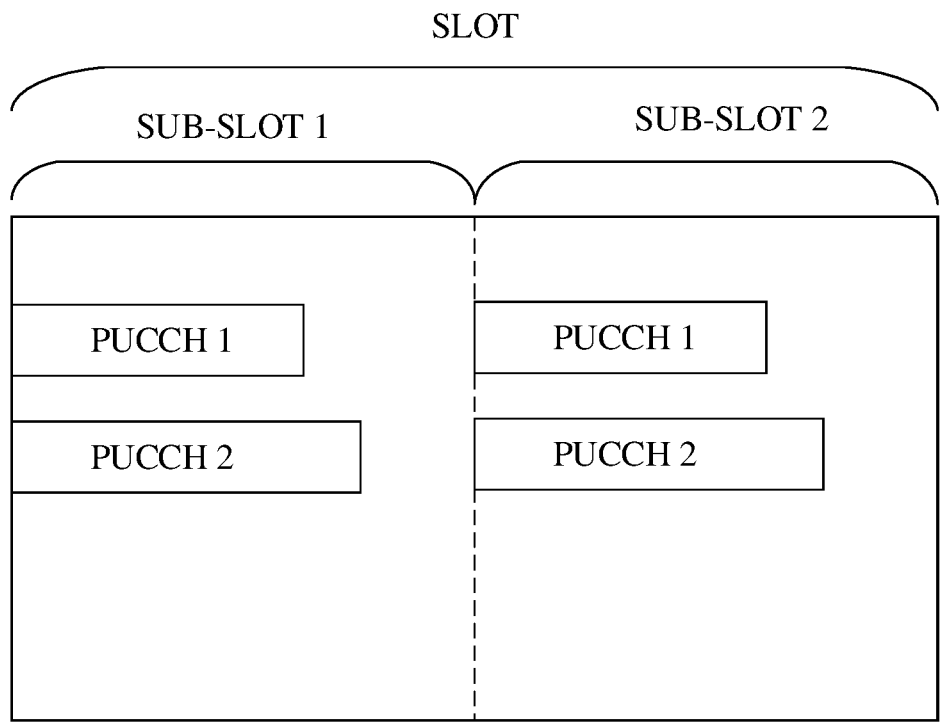
FIG. 2b is a schematic diagram illustrating PUCCU resource configuration for sub-slots provided in other implementations of the disclosure.
FIG. 3 is a schematic flowchart of a wireless communication method provided in implementations of the disclosure.

As illustrated in FIG. 2b, a PUCCH resource(s) may be configured uniformly for all sub-slot IDs, that is, each sub-slot has the same PUCCH resource configuration. For example, PUCCH 1 resource and PUCCH 2 resource may be configured uniformly in both sub-slot 1 and sub-slot 2. Similarly, each PUCCH resource configured cannot exceed a boundary of a slot to which the sub-slot belongs.

To summarize, a PUCCH resource(s) in each sub-slot can be determined in any of the above two manners illustrated in FIG. 2a and FIG. 2b. However, as to the manner of PUCCH resource configuration with sub-slot IDs as boundaries illustrated in FIG. 2a, since a PUCCH resource(s) is configured separately for each sub-slot ID, it will result in large radio resource control (RRC) signaling overhead. As to the manner of PUCCH resource configuration with sub-slot IDs as boundaries illustrated in FIG. 2b, although RRC signaling overhead can be saved, the PUCCH resource(s) configured is low in flexibility due to uniform PUCCH resource configuration for all sub-slot IDs.

To this end, implementations of the disclosure provide the following solutions, which can ensure flexibility in PUCCH resource configuration while avoiding large RRC signaling overhead.

The following will elaborate the solutions provided in implementations of the disclosure with reference to FIG. 3.

FIG. 3 is a schematic flowchart of a wireless communication method 300 provided in implementations of the disclosure.

310, a network device transmits first information to a terminal device, where the first information is used for indicating a PUCCH resource configured in a first slot, the first slot includes multiple sub-slots, and the first information includes a starting offset of the PUCCH resource relative to a boundary of the sub-slot.

The PUCCH resource of implementations of the disclosure may include one PUCCH resource, or may include multiple PUCCH resources, and the disclosure is not limited in this regard.

In implementations of the disclosure, supposing that the first slot includes two sub-slots, namely sub-slot 1 and sub-slot 2, the starting offset of the PUCCH resource relative to the boundary of the sub-slot included in the first information may refer to a starting offset of the PUCCH resource relative to a boundary of sub-slot 1, or may refer to a starting offset of the PUCCH resource relative to a boundary of sub-slot 2, or may also refer to a starting offset of the PUCCH resource relative to boundaries of sub-slot 1 and sub-slot 2.

It should be understood that, if the PUCCH resource in implementations of the disclosure includes multiple PUCCH resources, the PUCCH resource may also be referred to as a PUCCH resource set.

In implementations of the disclosure, before transmitting the first information to the terminal device, the network device can determine the first information, that is, configure a PUCCH resource(s) based on the first slot. After configuring PUCCH resource(s) based on the first slot, the network device can transmit the first information to the terminal device. Once receiving the first information, the terminal device can determine, based on the multiple sub-slots included in the first slot, an available PUCCH resource in at least one sub-slot among the multiple sub-slots.

According to the wireless communication method provided in implementations of the disclosure, the first information indicates the PUCCH resource in the first slot, and the PUCCH resource is carried in RRC signaling, as such, RRC signaling overhead can be saved. On the other hand, the first information includes the starting offset of the PUCCH resource relative to the boundary of the sub-slot, that is, the terminal device can determine a PUCCH resource suitable for the at least one sub-slot based on the starting offset relative to the boundary of the sub-slot, which is possible to ensure flexibility in PUCCH resource configuration.

Figure 4:
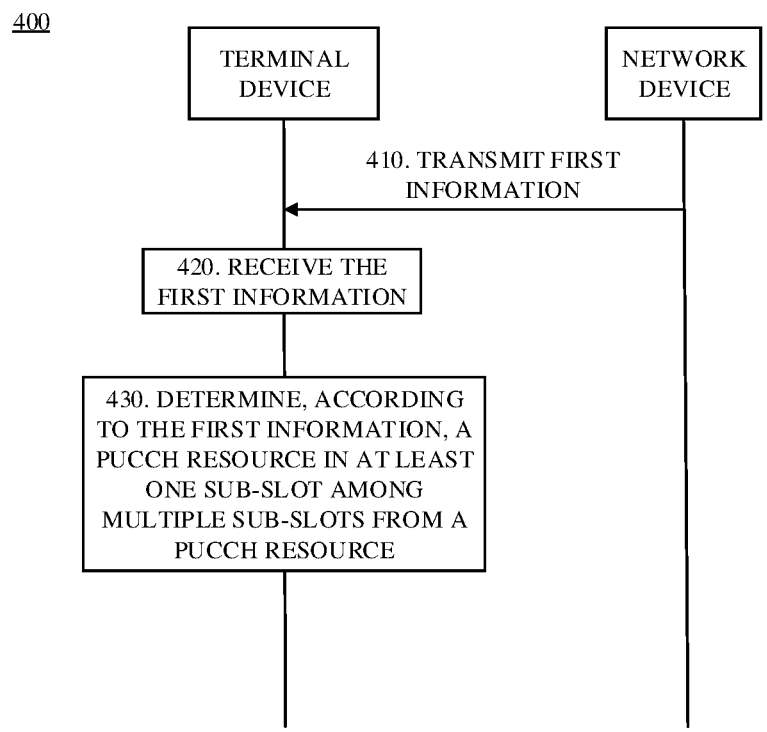
FIG. 4 is a schematic flowchart of a wireless communication method provided in other implementations of the disclosure.

FIG. 4 is a schematic flowchart of a wireless communication method 400 provided in other implementations of the disclosure.

410, a network device transmits first information to a terminal device, where the first information is used for indicating a PUCCH resource configured in a first slot, the first slot includes multiple sub-slots, and the first information includes a starting offset of the PUCCH resource relative to a boundary of the sub-slot.

420, the terminal device receives the first information transmitted by the network device.

430, according to the first information, the terminal device determines a PUCCH resource in at least one sub-slot among the multiple sub-slots from the PUCCH resource.

In implementations of the disclosure, after receiving the first information transmitted by the network device, the terminal device can determine the PUCCH resource for the at least one sub-slot from the PUCCH resource according to the first information.

Specifically, supposing that the first slot includes two sub-slots, namely sub-slot 1 and sub-slot 2, the first information further includes a starting offset of a PUCCH resource in sub-slot 1 and/or sub-slot 2 relative to a boundary of sub-slot 1 and/or sub-slot 2. As such, the terminal device can determine an available PUCCH resource in sub-slot 1 and/or sub-slot 2 according to the starting offset of the PUCCH resource in sub-slot 1 and/or sub-slot 2 relative to the boundary of sub-slot 1 and/or sub-slot 2. It is to be noted that, the starting offset relative to the boundary of sub-slot 1 and/or sub-slot 2 may be a value, or may be a starting offset configured exclusively for at least one sub-slot.

Optionally, in some implementations, a starting offset of the PUCCH resource in the at least one sub-slot is smaller than or equal to a configuration value of one sub-slot, or the starting offset of the PUCCH resource in the at least one sub-slot is limited by the configuration value of one sub-slot.

In implementations of the disclosure, the first slot may include multiple sub-slots. The starting offset of the PUCCH resource in the at least one sub-slot among the multiple sub-slots may be smaller than or equal to the configuration value of one sub-slot. In other words, the starting offset of the PUCCH resource in the at least one sub-slot among the multiple sub-slots is limited by the configuration value of one sub-slot.

The configuration value of a sub-slot in implementations of the disclosure may be comprehended as a length of the sub-slot, that is, the starting offset of the PUCCH resource in the at least one sub-slot is limited by a length of one sub-slot. "The starting offset of the PUCCH resource in the at least one sub-slot is limited by the length of one sub-slot" in implementations of the disclosure may mean that the starting offset of the PUCCH resource in the at least one sub-slot is smaller than or equal to the length of one sub-slot.

The configuration value of a sub-slot in implementations of the disclosure may also mean that the configuration value includes a start position and/or an end position of the sub-slot. In other words, the starting offset of the PUCCH resource in the at least one sub-slot is limited by a start position and/or an end position of one sub-slot.

For example, a length of the first slot is 14, the first slot includes two sub-slots, namely sub-slot 1 and sub-slot 2, and each sub-slot has a length of 7 symbols. In this case, a starting offset of a PUCCH resource in at least one sub-slot among the two sub-slots is smaller than or equal to 7 symbols, or the starting offset in the at least one sub-slot among the two sub-slots is limited by 7 symbols. In other words, in implementations of the disclosure, a starting offset of a PUCCH resource in sub-slot 1 may be smaller than or equal to 7 symbols, or a starting offset in sub-slot 2 may be smaller than or equal to 7 symbols, or a starting offset in each of sub-slot 1 and sub-slot 2 may be smaller than or equal to 7 symbols.

Optionally, in some other implementations, the starting offset of the PUCCH resource in the at least one sub-slot is smaller than or equal to a first threshold value, where the first threshold value is smaller than or equal to the configuration value of one sub-slot.

In implementations of the disclosure, for example, supposing that the first slot has a length of 14 symbols, the first slot includes two sub-slots, namely sub-slot 1 and sub-slot 2, and each sub-slot has a length of 7 symbols. If the first threshold value is 3, a starting offset in at least one sub-slot among the two sub-slots is smaller than or equal to 3 symbols. In other words, in implementations of the disclosure, a starting offset in sub-slot 1 may be smaller than or equal to 3 symbols, or a starting offset in sub-slot 2 may be smaller than or equal to 3 symbols, or a starting offset in each of sub-slot 1 and sub-slot 2 may be smaller than or equal to 3 symbols.

The listed value of the first threshold value in implementations of the disclosure is merely an example for illustration, and the first threshold value may also be of other values, for example, 4, 5, 6, or the like, and the disclosure is not limited in this regard. It is to be noted that, the first threshold value is smaller than or equal to the configuration value of one sub-slot, that is, if one sub-slot has a length of 7 symbols, the first threshold value can be set to any of 3, 4, 5, 6, or the like, as long as the first threshold value does not exceed the length of one sub-slot.

Optionally, in some implementations, the first information further includes at least one of: information of the at least one sub-slot, a length of the PUCCH resource, a starting symbol offset or starting symbol index of the PUCCH resource, a configuration of the first slot, or restriction information.

Optionally, in some implementations, the information of the at least one sub-slot includes at least one of: an index of the at least one sub-slot, or a position of a boundary of the at least one sub-slot.

Optionally, in some implementations, the position of a boundary of the at least one sub-slot includes a position of a lower boundary and/or a position of a starting boundary of the at least one sub-slot.

Specifically, for example, supposing that the first slot includes two sub-slots, namely sub-slot 1 and sub-slot 2, the first information may further include information of sub-slot 1 and/or sub-slot 2, for instance, an index of sub-slot 1 and/or sub-slot 2 and a position of a boundary of sub-slot 1 and/or sub-slot 2.

The position of a boundary of sub-slot 1 and/or sub-slot 2 in implementations of the disclosure may include a position of a lower boundary and a position of a starting boundary of sub-slot 1 and/or sub-slot 2. Specifically, taking sub-slot 1 as an example for illustration, a position of a lower boundary of sub-slot 1 included in the first information may refer to a smallest frequency-domain position of sub-slot 1, and a position of a starting boundary of sub-slot 1 included in the first information may refer to a smallest time-domain position of sub-slot 1.

The starting symbol offset or starting symbol index of the PUCCH resource in implementations of the disclosure may refer to a starting offset or a staring index of the PUCCH resource relative to a sub-slot. For example, the first slot includes two sub-slots, namely sub-slot 1 and sub-slot 2. If a starting offset of PUCCH resource 1 in sub-slot 1 relative to sub-slot 1 is 2, a starting symbol index of PUCCH resource 1 is 2, such that the terminal device can know a location of PUCCH resource 1 according to the starting symbol index. Alternatively, according to starting symbol index 2 of PUCCH resource 1, the terminal device can know the location of PUCCH resource 1, for instance, the location of the PUCCH resource 1 starts from the $2^{nd}$ symbol or a symbol of which a symbol index is 2.

It can be understood that, in implementations of the disclosure, starting offsets of the PUCCH resource relative to sub-slots may be in one-to-one correspondence with indexes. As such, once receiving the index of the PUCCH resource, the terminal device can know the location of the PUCCH resource. For example, if the starting offset of PUCCH resource 1 in sub-slot 1 relative to sub-slot 1 is 2, the starting symbol index of PUCCH resource 1 may also be 1 or other values, and the disclosure is not limited in this regard.

The restriction information in implementations of the disclosure may mean that a PUCCH resource selected cannot exceed a boundary of the first slot. In other words, when selecting a PUCCH resource in sub-slot 1 and/or sub-slot 2, an end position or upper boundary of the selected PUCCH resource cannot exceed the boundary of the first slot.

Optionally, in some implementations, a length of the PUCCH resource in the at least one sub-slot is smaller than or equal to the configuration value of the first slot. Alternatively, a start position and an end position of the PUCCH resource are located in the first slot.

In implementations of the disclosure, the configuration value of the first slot may be comprehended as the length of the first slot.

In implementations of the disclosure, suppose that the length of the first slot is 14 symbols, the first slot includes two sub-slots, namely sub-slot 1 and sub-slot 2, and each sub-slot has a length of 7 symbols. Then a length of a PUCCH resource in sub-slot 1 and/or sub-slot 2 is smaller than or equal to 14 symbols, or a start position and an end position of a PUCCH resource in sub-slot 1 and/or sub-slot 2 are in the 14 symbols included in the first slot.

Optionally, in some implementations, the PUCCH resource in the at least one sub-slot includes a PUCCH time-domain resource in the at least one sub-slot and/or a PUCCH frequency-domain resource in the at least one sub-slot.

In implementations of the disclosure, suppose that the length of the first slot is 14, and the first slot includes two sub-slots, namely sub-slot 1 and sub-slot 2. Then a PUCCH resource in sub-slot 1 and/or sub-slot 2 may include a time-domain resource and/or a frequency-domain resource.

Optionally, in some implementations, the method further includes the following. The terminal device transmits uplink control information (UCI) to the network device on the determined PUCCH resource in the at least one sub-slot.

In implementations of the disclosure, the terminal device can determine the PUCCH resource in the at least one sub-slot from the PUCCH resources according to the first information. After determining the PUCCH resource in the at least one sub-slot, the terminal device can transmit the UCI to the network device on the determined PUCCH resource in the at least one sub-slot.

In implementations of the disclosure, the UCI transmitted by the terminal device to the network device may include hybrid automatic repeat request-acknowledgement/non-acknowledgement (HARQ-ACK/NACK), channel state information (CSI), a scheduling request (SR), and the like. The HARQ-ACK/NACK may be used for HARQ confirmation of downlink (DL) data transmitted on a physical downlink shared channel (PDSCH). The CSI may include a channel quality indicator (CQI), a precoding matrix indicator (PMI), a rank indication (RI), and the like, and is used for informing the network device of DL channel quality, such that the network device can properly perform DL scheduling. The SR can be used for requesting an uplink-shared channel (UL-SCH) resource from the network device.

Optionally, in some implementations, the terminal device transmits the UCI to the network device on the determined PUCCH resource in the at least one sub-slot as follows. The terminal device determines a first target PUCCH resource in the at least one sub-slot. The terminal device transmits the UCI to the network device on the first target PUCCH resource in the at least one sub-slot.

In implementations of the disclosure, after determining an available PUCCH resource in sub-slot 1 and/or sub-slot 2, the terminal device can determine the first target PUCCH resource in the at least one sub-slot, such that the terminal device can transmit the UCI to the network device on the first target PUCCH resource.

The first target PUCCH resource in implementations of the disclosure may include one PUCCH resource, or may include multiple PUCCH resources, and the disclosure is not limited in this regard. If a PUCCH resource or the first target PUCCH resource determined in one sub-slot includes one PUCCH resource, the terminal device can transmit the UCI to the network device on this one PUCCH resource or the first target PUCCH resource. If the PUCCH resource or the first target PUCCH resource determined in one sub-slot includes multiple PUCCH resources, the terminal device can select one PUCCH resource from the multiple PUCCH resources to transmit the UCI to the network device.

As pointed above, after determining an available PUCCH resource in the at least one sub-slot, the terminal device can determine the first target PUCCH resource in the at least one sub-slot. The following will describe in detail how the terminal device determines the first target PUCCH resource in the at least one sub-slot.

Optionally, in some implementations, the terminal device determines the first target PUCCH resource in the at least one sub-slot as follows. The terminal device receives downlink control information (DCI) and/or RRC signaling transmitted by the network device, where the DCI and/or the RRC signaling carries second information. The terminal device determines the first target PUCCH resource in the at least one sub-slot according to the DCI and/or the RRC signaling.

Specifically, the terminal device determines the first target PUCCH resource in the at least one sub-slot according to the second information carried in the DCI and/or the RRC signaling.

In some implementations, the terminal device may not determine the first target PUCCH resource. Instead, the terminal device may transmit the UCI on a PUCCH resource indicated by the DCI and/or the RRC signaling transmitted by the network device.

Optionally, in some implementations, the second information includes at least one of: a position of a sub-slot for transmitting the UCI, an ID of the sub-slot for transmitting the UCI, an offset of the sub-slot for transmitting the UCI relative to a frame or slot or sub-slot in which the DCI and/or the RRC signaling is located, an offset of the sub-slot for transmitting the UCI relative to a frame or slot or sub-slot corresponding to PDSCH transmission indicated by the DCI, a PUCCH resource set ID, or a PUCCH resource ID.

In implementations of the disclosure, supposing that the first slot includes two sub-slots, namely sub-slot 1 and sub-slot 2, the terminal device can determine the first target PUCCH resource after determining an available PUCCH resource in sub-slot 1 and/or sub-slot 2. The first target PUCCH resource can be determined in the above manner.

For example, take the position of the sub-slot for transmitting the UCI as an example for illustration. After the terminal device receives the DCI and/or the RRC signaling transmitted by the network device, since the second information carried in the DCI and/or the RRC signaling includes the position of the sub-slot for transmitting the UCI, the terminal device can determine, according to the position of the sub-slot for transmitting the UCI included in the second information, which sub-slot's PUCCH resource is to be used for transmission. Specifically, the terminal device can determine to use the first target PUCCH resource in sub-slot 1 and/or sub-slot 2 for transmission.

For another example, take the position of the sub-slot for transmitting the UCI and PUCCH resource ID as another example for illustration. After the terminal device receives the DCI and/or the RRC signaling transmitted by the network device, since the second information carried in the DCI and/or the RRC signaling includes the position of the sub-slot for transmitting the UCI and the PUCCH resource ID, the terminal device can determine, according to the position of the sub-slot for transmitting the UCI and the PUCCH resource ID included in the second information, which PUCCH resource in which sub-slot is to be used for transmission. Specifically, the terminal device can determine to use a specified PUCCH resource in sub-slot 1 or sub-slot 2 for transmission.

If the position of the sub-slot for transmitting the UCI included in the second information is sub-slot 1, the terminal device can determine the first target PUCCH resource from sub-slot 1. Supposing that there is PUCCH resource 1 in sub-slot 1, the terminal device can determine PUCCH resource 1 as the first target PUCCH resource. As such, the terminal device can transmit the UCI to the network device on PUCCH resource 1 in sub-slot 1. Supposing that there are PUCCH resource 1 and PUCCH resource 2 in sub-slot 1, the terminal device can select one PUCCH resource from PUCCH resource 1 and PUCCH resource 2 as the first target PUCCH resource for transmitting the UCI.

The terminal device can also determine the first target PUCCH resource in the at least one sub-slot according to the offset of the sub-slot for transmitting the UCI relative to a frame or slot or sub-slot in which the DCI and/or the RRC signaling is located carried in the second information. Supposing that the slot in which the DCI and/or the RRC signaling is located is slot 1 or sub-slot 1 of slot 1, upon receiving the offset of the sub-slot for transmitting the UCI relative to a frame or slot or sub-slot in which the DCI and/or the RRC signaling is located, the terminal device can determine the first target PUCCH resource according to the offset as well as the slot in which the DCI and/or the RRC signaling is located. If the offset is 2, the terminal device can determine a slot that is 2 slots away from slot 1 or sub-slot 1 of the slot as a slot in which the first target PUCCH resource is located, thereby determining the first target PUCCH resource.

For another example, the terminal device can also determine the first target PUCCH resource in the at least one sub-slot according to the offset of the sub-slot for transmitting the UCI relative to a frame or slot or sub-slot in which the DCI and/or the RRC signaling is located and the PUCCH resource ID carried in the second information. Supposing that the slot in which the DCI and/or the RRC signaling is located is slot 1 or sub-slot 1 of slot 1, upon receiving the offset of the sub-slot for transmitting the UCI relative to a frame or slot or sub-slot in which the DCI and/or the RRC signaling is located and PUCCH resource ID 1, the terminal device can determine the first target PUCCH resource according to the offset as well as the slot in which the DCI and/or the RRC signaling is located and PUCCH resource ID 1. If the offset is 2, the terminal device can determine a PUCCH resource of PUCCH resource ID 1 in a slot that is 2 slots away from slot 1 or sub-slot 1 of the slot, to transmit the UCI.

The terminal device can also determine the first target PUCCH resource in the at least one sub-slot according to other information, for example, the ID of the sub-slot for transmitting the UCI, or the offset of the sub-slot for transmitting the UCI relative to a frame or slot or sub-slot corresponding to PDSCH transmission indicated by the DCI, or the PUCCH resource set ID, or the PUCCH resource ID. These manners are similar to the above-described manner of determining the first target PUCCH resource in the at least one sub-slot according to the position of the sub-slot for transmitting the UCI and the offset of the sub-slot for transmitting the UCI relative to a frame or slot or sub-slot in which the DCI and/or the RRC signaling is located, and thus will not be described in detail herein for the sake of simplicity.

Optionally, in some implementations, when the first target PUCCH resource includes multiple PUCCH resources, the method further includes the following. The terminal device selects a second target PUCCH resource from the first target PUCCH resource. The terminal device transmits the UCI to the network device on the first target PUCCH resource in the at least one sub-slot as follows. The terminal device transmits the UCI to the network device on the second target PUCCH resource in the at least one sub-slot.

Optionally, in some implementations, the terminal device selects the second target PUCCH resource from the first target PUCCH resource as follows. The terminal device selects the second target PUCCH resource from the first target PUCCH resource according to a preset condition.

In implementations of the disclosure, if the terminal device determines that an available PUCCH resource or the first target PUCCH resource in the at least one sub-slot includes multiple PUCCH resources, the terminal device can determine one PUCCH resource from the first target PUCCH resource as the second target PUCCH resource, thereby transmitting the UCI to the network device on the second target PUCCH resource in the at least one sub-slot.

Alternatively, the terminal device can determine one PUCCH resource from the determined multiple available PUCCH resources in the at least one sub-slot as the second target PUCCH resource, thereby transmitting the UCI to the network device on the second target PUCCH resource in the at least one sub-slot.

Specifically, supposing that the first slot includes two sub-slots, namely sub-slot 1 and sub-slot 2, if the terminal device determines that the available first target PUCCH resource in sub-slot 1 includes PUCCH resource 1 and PUCCH resource 2, the terminal device can select one PUCCH resource from PUCCH resource 1 and PUCCH resource 2 as the second target PUCCH resource, thereby transmitting the UCI to the network device on the second target PUCCH resource in sub-slot 1.

Similarly, supposing that the first slot includes two sub-slots, namely sub-slot 1 and sub-slot 2, if the terminal device determines that an available PUCCH resource in sub-slot 1 includes PUCCH resource 1 and PUCCH resource 2, the terminal device can select one PUCCH resource from PUCCH resource 1 and PUCCH resource 2 as the second target PUCCH resource, thereby transmitting the UCI to the network device on the second target PUCCH resource in sub-slot 1.

As pointed above, if the first target PUCCH resource includes multiple PUCCH resources, the terminal device can select one PUCCH resource from the multiple PUCCH resources to transmit the UCI to the network device. The following will elaborate how the terminal device selects one PUCCH resource from multiple PUCCH resources to transmit the UCI to the network device.

Optionally, in some implementations, the preset condition includes at least one of: any PUCCH resource in the first target PUCCH resource, a PUCCH resource with the longest PUCCH duration in the first target PUCCH resource, a PUCCH resource with the shortest PUCCH duration in the first target PUCCH resource, a PUCCH resource with an upper boundary closest to an upper boundary of the at least one sub-slot in the first target PUCCH resource, a PUCCH resource with an upper boundary farthest from the upper boundary of the at least one sub-slot in the first target PUCCH resource, a PUCCH resource with a lower boundary closest to a lower boundary of the at least one sub-slot in the first target PUCCH resource, a PUCCH resource with the latest end position in the first target PUCCH resource, a PUCCH resource with the earliest start position in the first target PUCCH resource, a PUCCH resource corresponding to UCI having the highest priority, or a PUCCH resource having the highest priority.

As an example, the terminal device selects a PUCCH resource with the longest PUCCH duration among multiple PUCCH resources. Assuming that the terminal device receives a DCI scheduled DL transmission transmitted by the network device, which indicates that the terminal device needs to transmit corresponding HARQ-ACK on PUCCH resource 1 in sub-slot 1. In addition, the terminal device has also triggered an SR, and a PUCCH resource ID corresponding to the SR is 4, that is, the terminal device needs to transmit the SR on PUCCH resource 4 in sub-slot 1 according to PUCCH resource ID 4 indicated. In this scenario, the terminal device can select a PUCCH resource with a longer PUCCH duration from PUCCH resource 1 and PUCCH resource 4 to transmit the corresponding HARQ-ACK and/or the SR. If the PUCCH resource with a longer PUCCH duration in PUCCH resource 1 and PUCCH resource 4 is PUCCH resource 1, the terminal device can transmit the corresponding HARQ-ACK and/or the SR on PUCCH resource 1 in sub-slot 1.

Similarly, suppose that the terminal device selects a PUCCH resource with the latest end position among multiple PUCCH resources. Suppose that the terminal device needs to transmit corresponding HARQ-ACK on PUCCH resource 1 in sub-slot 1, and also needs to transmit an SR on PUCCH resource 4 in sub-slot 1. In this case, the terminal device can select a PUCCH resource with a later end position from PUCCH resource 1 and PUCCH resource 4 to transmit the corresponding HARQ-ACK and/or the SR. If a PUCCH resource with the later end position in PUCCH resource 1 and PUCCH resource 4 is PUCCH resource 1, the terminal device can transmit the corresponding HARQ-ACK and/or the SR on PUCCH resource 1 in sub-slot 1.

Similarly, the terminal device can also select, according to other preset conditions, a PUCCH resource to transmit the corresponding HARQ-ACK and the SR, the HARQ-ACK and a channel status indicator reference signal (CSI-RS), the CSI-RS and the SR, or the like, which will not be elaborated herein for the sake of simplicity.

In order for better understanding of the technical solutions of the disclosure, an elaboration will be given below with reference to FIG. 5a and FIG. 5b.

Figure 5A:
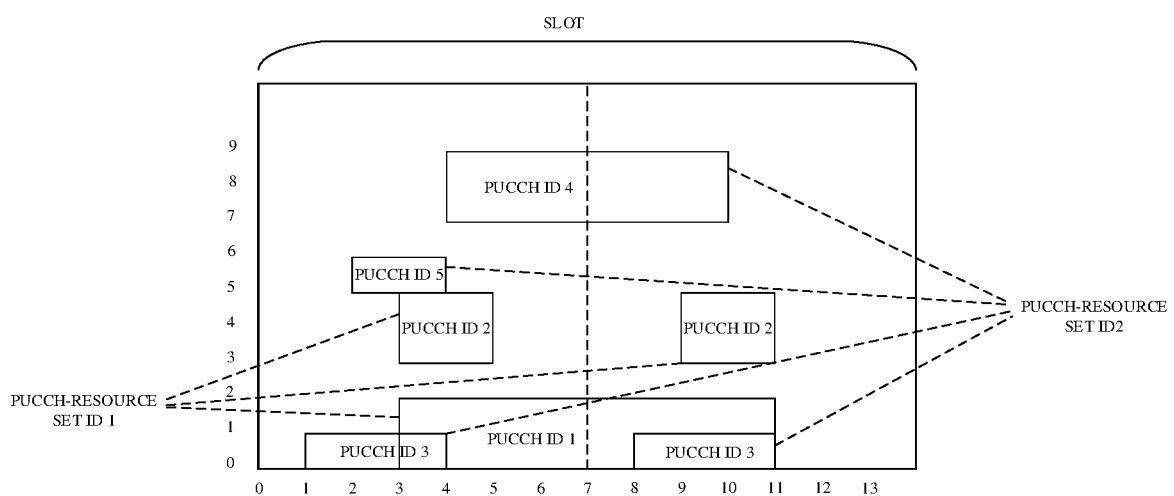
FIG. 5a is a schematic diagram of identities (ID) of PUCCH resources configured by a network device based on a first slot provided in implementations of the disclosure.

FIG. 5a is a schematic diagram of IDs of PUCCH resources configured by the network device for the first slot provided in implementations of the disclosure. In FIG. 5a, a horizontal axis represents a time domain, and a vertical axis represents a frequency domain.

As illustrated in FIG. 5a, the PUCCH resource configured for the first slot by the network device includes two PUCCH resource sets, namely PUCCH resource set 1 and PUCCH resource set 2.

(1) An ID corresponding to PUCCH resource set 1 is PUCCH resource set ID 1, and PUCCH resource set 1 includes two PUCCH resources, namely PUCCH resource 1 and PUCCH resource 2.

An ID corresponding to PUCCH resource 1 is PUCCH resource ID 1. A starting physical resource block (PRB) of PUCCH resource 1 is 0. A format supported by PUCCH resource 1 is format 2. PUCCH resource 1 occupies 2 PRBs in total. An offset of PUCCH resource 1 relative to a sub-slot boundary is 3 symbols, that is, a starting symbol index of PUCCH resource 1 is 3. A PUCCH duration of PUCCH resource 1 is 8 symbols.

An ID corresponding to PUCCH resource 2 is PUCCH resource ID 2. A starting PRB of PUCCH resource 2 is 3. A format supported by PUCCH resource 2 is format 2. PUCCH resource 2 occupies 2 PRBs in total. An offset of PUCCH resource 2 relative to a sub-slot boundary is 3 symbols, that is, a starting symbol index of PUCCH resource 2 is 3. A PUCCH duration of PUCCH resource 2 is 2 symbols.

(2) An ID corresponding to PUCCH resource set 2 is PUCCH resource set ID 2, and PUCCH resource set 2 includes 3 PUCCH resources, namely PUCCH resource 3, PUCCH resource 4, and PUCCH resource 5.

An ID corresponding to PUCCH resource 3 is PUCCH resource ID 3. A starting PRB of PUCCH resource 3 is 0. A format supported by PUCCH resource 3 is format 2. PUCCH resource 3 occupies 1 PRB in total. An offset of PUCCH resource 3 relative to a sub-slot boundary is 1 symbol, that is, a starting symbol index of PUCCH resource 3 is 1. A PUCCH duration of PUCCH resource 3 is 3 symbols.

An ID corresponding to PUCCH resource 4 is PUCCH resource ID 4. A starting PRB of PUCCH resource 4 is 7. A format supported by PUCCH resource 4 is format 2. PUCCH resource 4 occupies 2 PRBs in total. An offset of PUCCH resource 4 relative to a sub-slot boundary is 4 symbols, that is, a starting symbol index of PUCCH resource 4 is 4. A PUCCH duration of PUCCH resource 4 is 6 symbols.

An ID corresponding to PUCCH resource 5 is PUCCH resource ID 5. A starting PRB of PUCCH resource 5 is 5. A format supported by PUCCH resource 5 is format 2. PUCCH resource 5 occupies 1 PRB in total. An offset of PUCCH resource 5 relative to a sub-slot boundary is 2 symbols, that is, a starting symbol index of PUCCH resource 5 is 2. A PUCCH duration of PUCCH resource 5 is 2 symbols.

The PUCCH resource configured by the network device for the first slot has been described above. After configuring PUCCH resources, the network device transmits to the terminal device the configured PUCCH resources as well as information of the configured PUCCH resources, such that the terminal device can determine an available PUCCH resource in the at least one sub-slot of the first slot. The following will describe in detail how the terminal device determines an available PUCCH resource in the at least one sub-slot of the first slot.

Figure 5B:
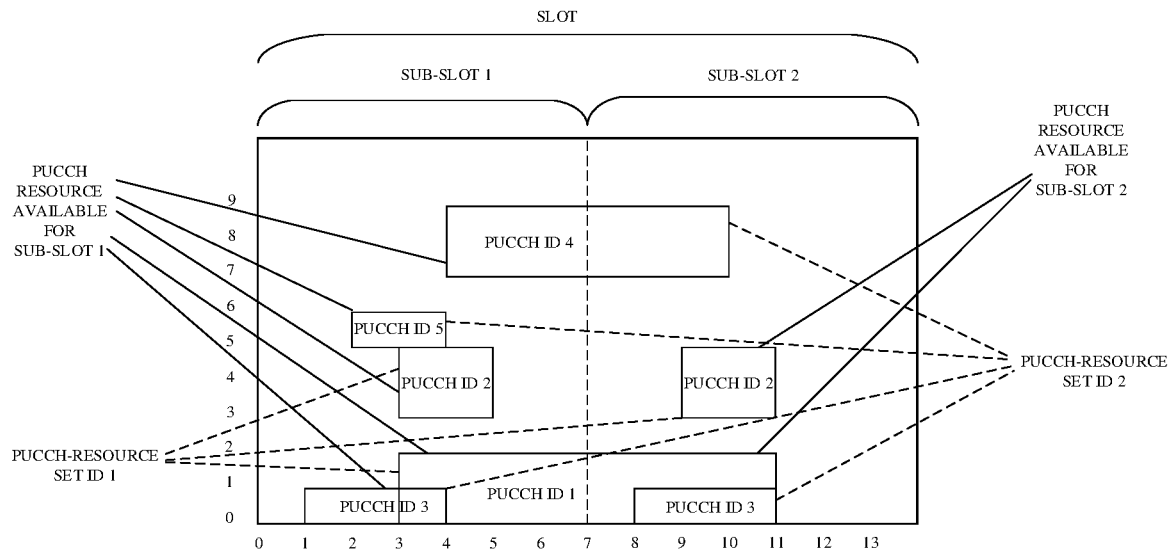
FIG. 5b is a schematic diagram illustrating determination of a PUCCH resource available for a sub-slot by a terminal device from PUCCH resources configured by a network device based on a first slot, provided in implementations of the disclosure.

FIG. 5b is a schematic diagram illustrating determination of an available PUCCH resource in a sub-slot by the terminal device from the PUCCH resources configured by the network device based on the first slot, provided in implementations of the disclosure.

When determining an available PUCCH resource in the at least one sub-slot of the first slot, the terminal device can determine according to information included in the first information. The first information may include: the information of the at least one sub-slot, for example, an ID of the sub-slot and/or a position of a boundary of the sub-slot (such as a position of a lower boundary and/or a start-boundary position; the length of the PUCCH resource; the starting symbol offset and starting symbol index of the PUCCH resource; the configuration of the first slot; and restriction information, for example, a start position and an end position of a selected PUCCH resource are located in the first slot.

Specifically, take an ID corresponding to PUCCH resource 1, namely PUCCH ID 1, as an example for illustration. In implementations of the disclosure, an offset of PUCCH resource 1 relative to a boundary of sub-slot 1 is 3 symbols. A length of PUCCH resource 1 is smaller than that of the first slot. A starting PRB of PUCCH resource 1 is 0, and PUCCH resource 1 occupies 2 PRBs in total, that is, from a position at which the frequency domain is 0 to a position at which the frequency domain is 2. Therefore, PUCCH resource 1 can be taken as an available PUCCH resource in sub-slot 1.

Similarly, PUCCH resource 2, PUCCH resource 3, PUCCH resource 4, and PUCCH resource 5 each can be taken as an available PUCCH resource in sub-slot 1.

An ID corresponding to each of PUCCH resource 2, PUCCH resource 3, PUCCH resource 4, and PUCCH resource 5 in implementations of the disclosure may be PUCCH ID 2, PUCCH ID 3, PUCCH ID 4, and PUCCH ID 5 respectively that are illustrated in FIG. 5a and FIG. 5b.

As to sub-slot 2, since a start position of each of PUCCH resource 1, PUCCH resource 4, and PUCCH resource 5 is located in sub-slot 1, PUCCH resource 1, PUCCH resource 4, and PUCCH resource 5 cannot be taken as an available PUCCH resource in sub-slot 2.

However, a start position of each of PUCCH resource 3 and PUCCH resource 2 is located in sub-slot 2. A length of PUCCH resource 3 is 3 symbols and a length of PUCCH resource 2 is 2 symbols, which do not exceed a boundary of the slot. In addition, a starting PRB of PUCCH resource 3 is 0, and PUCCH resource 3 occupies 1 PRB in total, that is, from a position at which the frequency domain is 0 to a position at which the frequency domain is 1. A starting PRB of PUCCH resource 2 is 3, and PUCCH resource 2 occupies 2 PRBs in total, that is, from a position at which the frequency domain is 3 to a position at which the frequency domain is 5. Therefore, PUCCH resource 3 and PUCCH resource 2 can be taken as available PUCCH resources in sub-slot 2.

To summarize, the available PUCCH resource in sub-slot 1 determined by the terminal device includes: PUCCH resource 1, PUCCH resource 2, PUCCH resource 3, PUCCH resource 4, and PUCCH resource 5. The available PUCCH resource in sub-slot 2 determined by the terminal device includes: PUCCH resource 2 and PUCCH resource 3.

After the terminal device determines available PUCCH resources in sub-slot 1 and sub-slot 2, if the terminal device receives the DCI and/or the RRC signaling transmitted by the network device, the terminal device determines the first target PUCCH resource or a PUCCH resource for use (such as a PUCCH resource with a specified ID) in sub-slot 1 and/or sub-slot 2 according to a location and/or an offset included in information carried in the DCI and/or the RRC signaling.

For example, take the position of the sub-slot for transmitting the UCI as an example for illustration. After the terminal device receives the DCI and/or the RRC signaling transmitted by the network device, since the second information carried in the DCI and/or the RRC signaling includes the position of the sub-slot for transmitting the UCI, the terminal device can determine, according to the position of the sub-slot for transmitting the UCI included in the second information, information of a sub-slot in which the PUCCH resource for use is located, or determine the first target PUCCH resource in sub-slot 1 and/or sub-slot 2.

If the position of the sub-slot for transmitting the UCI included in the second information is sub-slot 1, the terminal device can determine the first target PUCCH resource from sub-slot 1. Supposing that there is PUCCH resource 1 in sub-slot 1, the terminal device can determine PUCCH resource 1 as the first target PUCCH resource, thereby transmitting the UCI to the network device on PUCCH resource 1 in sub-slot 1. Supposing that an ID of the PUCCH resource for use indicated by the RRC signaling or the DCI is PUCCH resource ID 1, that is, PUCCH resource 1, the terminal device can transmit the UCI to the network device on PUCCH resource 1 in sub-slot 1.

In some cases, if the terminal device receives the DCI of the network device, where the DCI indicates that an ID of a PUCCH resource for transmitting corresponding HARQ-ACK is 1, the terminal device can transmit the corresponding HARQ-ACK on PUCCH resource 1 in sub-slot 1 according to PUCCH resource ID 1 indicated. In addition, the terminal device has also triggered transmission of an SR, and a PUCCH resource ID corresponding to the SR is 4, that is, the terminal device needs to transmit the SR on PUCCH resource 4 in sub-slot 1 according to PUCCH resource ID 4 indicated.

However, since only one PUCCH resource can be transmitted in one sub-slot at one time, the terminal device has to select one PUCCH resource from multiple PUCCH resources to transmit the corresponding HARQ-ACK and the SR.

Specifically, when selecting one PUCCH resource from multiple PUCCH resources to transmit the corresponding HARQ-ACK and the SR, the terminal device may select based on different preset conditions. For example, the terminal device may randomly select one PUCCH resource from the multiple PUCCH resources. Alternatively, the terminal device may select a PUCCH resource with the longest PUCCH duration among the multiple PUCCH resources. Alternatively, the terminal device may select a PUCCH resource with the shortest PUCCH duration among the multiple PUCCH resources. Alternatively, the terminal device may select a PUCCH resource with an upper boundary closest to an upper boundary of the sub-slot among the multiple PUCCH resources. Alternatively, the terminal device may select a PUCCH resource with a lower boundary closest to a lower boundary of the sub-slot among the multiple PUCCH resources. Alternatively, the terminal device may select a PUCCH resource with the latest end position among the multiple PUCCH resources. Alternatively, the terminal device may select a PUCCH resource with the earliest start position among the multiple PUCCH resources. Alternatively, the terminal device may select a PUCCH resource corresponding to UCI having the highest priority. Alternatively, the terminal device may select a PUCCH resource having the highest priority.

As an example, the terminal device may select a PUCCH resource with the longest PUCCH duration among the multiple PUCCH resources. Suppose that the terminal device receives the DCI transmitted by the network device, which indicates that the terminal device needs to transmit corresponding HARQ-ACK on PUCCH resource 1 in sub-slot 1. In addition, the terminal device has also triggered an SR, and a PUCCH resource ID corresponding to the SR is 4, that is, the terminal device needs to transmit the SR on PUCCH resource 4 in sub-slot 1 according to PUCCH resource ID 4 indicated. In this case, the terminal device can select a PUCCH resource with a longer PUCCH duration in PUCCH resource 1 and PUCCH resource 4 to transmit the corresponding HARQ-ACK and/or the SR. As illustrated in FIG. 5a and FIG. 5b, the PUCCH resource with a longer PUCCH duration in PUCCH resource 1 and PUCCH resource 4 is PUCCH resource 1, and therefore, the terminal device can transmit the corresponding HARQ-ACK and/or the SR on PUCCH resource 1 in sub-slot 1.

Similarly, the terminal device may select a PUCCH resource with the latest end position among the multiple PUCCH resources. Suppose that the terminal device needs to transmit the corresponding HARQ-ACK on PUCCH resource 1 in sub-slot 1, and the terminal device also needs to transmit the SR on PUCCH resource 4 in sub-slot 1. In this case, the terminal device can select a PUCCH resource with the later end position in PUCCH resource 1 and PUCCH resource 4 to transmit the corresponding HARQ- ACK and/or the SR. As illustrated in FIG. 5a and FIG. 5b, the PUCCH resource with the latest end position in PUCCH resource 1 and PUCCH resource 4 is PUCCH resource 1, and therefore the terminal device can transmit the corresponding HARQ-ACK and/or the SR on PUCCH resource 1 in sub-slot 1.

Similarly, the terminal device may select one PUCCH resource according to other preset conditions, to transmit the corresponding HARQ-ACK and the SR, the HARQ-ACK and a CSI-RS, the CSI-RS and the SR, or the like, which will not be elaborated herein for the sake of simplicity.

Method implementations of the disclosure have been described in detail above with reference to FIG. 1 to FIG. 5. The following will describe apparatus implementations of the disclosure with reference to FIG. 6 to FIG. 10. Apparatus implementations and method implementations correspond to each other. For details not elaborated herein, reference can be made to the foregoing method implementations.

Figure 6:
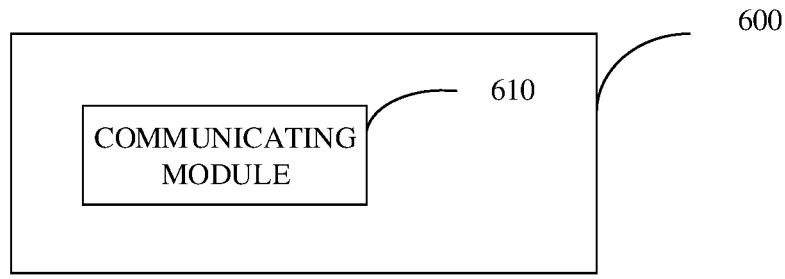
FIG. 6 is a schematic structural diagram of a wireless communication apparatus provided in implementations of the disclosure.

FIG. 6 is a schematic structural diagram of a wireless communication apparatus 600 provided in implementations of the disclosure. The wireless communication apparatus 600 includes a communicating module 610. The communicating module 610 is configured to transmit first information to a terminal device, where the first information is used for indicating a PUCCH resource configured in a first slot, the first slot includes multiple sub-slots, and the first information includes a starting offset of the PUCCH resource relative to a boundary of the sub-slot.

Optionally, in some implementations, a starting offset of a PUCCH resource in at least one sub-slot among the multiple sub-slots is smaller than or equal to a configuration value of one sub-slot.

Optionally, in other implementations, the starting offset of the PUCCH resource in the at least one sub-slot among the multiple sub-slots is smaller than or equal to a first threshold value, where the first threshold value is smaller than or equal to a configuration value of one sub-slot.

Optionally, in some implementations, the first information further includes at least one of: information of the at least one sub-slot among the multiple sub-slots, a length of the PUCCH resource, a starting symbol offset or starting symbol index of the PUCCH resource, a configuration of the first slot, or restriction information.

Optionally, in some implementations, the information of the at least one sub-slot includes at least one of: an index of the at least one sub-slot, or a position of a boundary of the at least one sub-slot.

Optionally, in some implementations, the position of a boundary of the at least one sub-slot includes a position of a lower boundary and/or a position of a starting boundary of the at least one sub-slot.

Optionally, in some implementations, a length of the PUCCH resource in the at least one sub-slot among the multiple sub-slots is smaller than or equal to the configuration value of the first slot. Alternatively, a start position and an end position of the PUCCH resource are located in the first slot.

Optionally, in some implementations, the PUCCH resource in the at least one sub-slot among the multiple sub-slots includes a PUCCH time-domain resource in the at least one sub-slot and/or a PUCCH frequency-domain resource in the at least one sub-slot.

Figure 7:
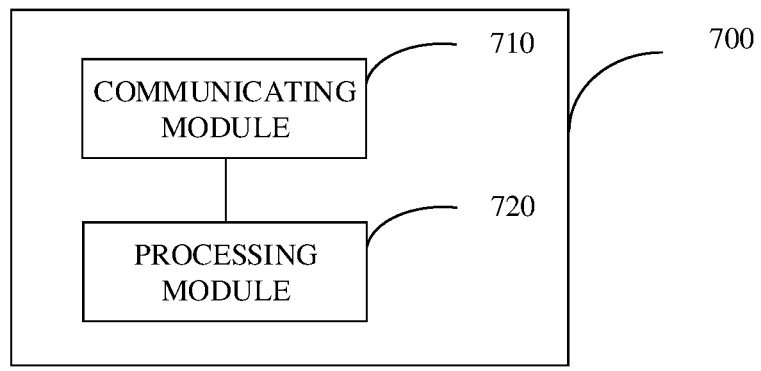
FIG. 7 is a schematic structural diagram of a wireless communication apparatus provided in other implementations of the disclosure.

FIG. 7 is a schematic structural diagram of a wireless communication apparatus 700 provided in other implementations of the disclosure. The wireless communication apparatus 700 includes a communicating module 710 and a processing module 720. The communicating module 710 is configured to receive first information transmitted by a network device, where the first information is used for indicating a PUCCH resource configured in a first slot, the first slot includes multiple sub-slots, and the first information includes a starting offset of the PUCCH resource relative to a boundary of the sub-slot. The processing module 720 is configured to determine a PUCCH resource in at least one sub-slot among the multiple sub-slots from the PUCCH resource according to the first information.

Optionally, in some implementations, a starting offset of the PUCCH resource in the at least one sub-slot is smaller than or equal to a configuration value of one sub-slot.

Optionally, in other implementations, a starting offset of the PUCCH resource in the at least one sub-slot is smaller than or equal to a first threshold value, where the first threshold value is smaller than or equal to a configuration value of one sub-slot.

Optionally, in some implementations, the first information further includes at least one of: information of the at least one sub-slot, a length of the PUCCH resource, a starting symbol offset or starting symbol index of the PUCCH resource, a configuration of the first slot, or restriction information.

Optionally, in some implementations, the information of the at least one sub-slot includes at least one of: an index of the at least one sub-slot, or a position of a boundary of the at least one sub-slot.

Optionally, in some implementations, the position of a boundary of the at least one sub-slot includes a position of a lower boundary and/or a position of a starting boundary of the at least one sub-slot.

Optionally, in some implementations, a length of the PUCCH resource in the at least one sub-slot is smaller than or equal to the configuration value of the first slot. Alternatively, a start position and an end position of the PUCCH resource in the at least one sub-slot are located in the first slot.

Optionally, in some implementations, the PUCCH resource in the at least one sub-slot includes a PUCCH time-domain resource in the at least one sub-slot and/or a PUCCH frequency-domain resource in the at least one sub-slot.

Optionally, in some implementations, the communicating module 710 is further configured to transmit UCI to the network device on the determined PUCCH resource in the at least one sub-slot.

Optionally, in some implementations, the processing module 720 is configured to determine a first target PUCCH resource in the at least one sub-slot. The communicating module 710 is configured to transmit the UCI to the network device on the first target PUCCH resource in the at least one sub-slot.

Optionally, in some implementations, the communicating module 710 is configured to receive DCI and/or RRC signaling transmitted by the network device, where the DCI and/or the RRC signaling carries second information. The processing module 720 is configured to determine the first target PUCCH resource in the at least one sub-slot according to the DCI and/or the RRC signaling.

Optionally, in some implementations, the second information includes at least one of: a position of a sub-slot for transmitting the UCI, an ID of the sub-slot for transmitting the UCI, an offset of the sub-slot for transmitting the UCI relative to a frame or slot or sub-slot in which the DCI and/or the RRC signaling is located, an offset of the sub-slot for transmitting the UCI relative to a frame or slot or sub-slot corresponding to PDSCH transmission indicated by the DCI, a PUCCH resource set ID, or a PUCCH resource ID.

Optionally, in some implementations, if the first target PUCCH resource includes multiple PUCCH resources, the processing module 720 is further configured to select a second target PUCCH resource from the first target PUCCH resource. The communicating module 710 is configured to transmit the UCI to the network device on the second target PUCCH resource in the at least one sub-slot.

Optionally, in some implementations, the processing module 720 is configured to select the second target PUCCH resource from the first target PUCCH resource according to a preset condition.

Optionally, in some implementations, the preset condition includes at least one of: any PUCCH resource in the first target PUCCH resource, a PUCCH resource with the longest PUCCH duration in the first target PUCCH resource, a PUCCH resource with the shortest PUCCH duration in the first target PUCCH resource, a PUCCH resource with an upper boundary closest to an upper boundary of the at least one sub-slot in the first target PUCCH resource, a PUCCH resource with an upper boundary farthest from the upper boundary of the at least one sub-slot in the first target PUCCH resource, a PUCCH resource with a lower boundary closest to a lower boundary of the at least one sub-slot in the first target PUCCH resource, a PUCCH resource with the latest end position in the first target PUCCH resource, a PUCCH resource with the earliest start position in the first target PUCCH resource, a PUCCH resource corresponding to UCI having the highest priority, or a PUCCH resource having the highest priority.

Figure 8:
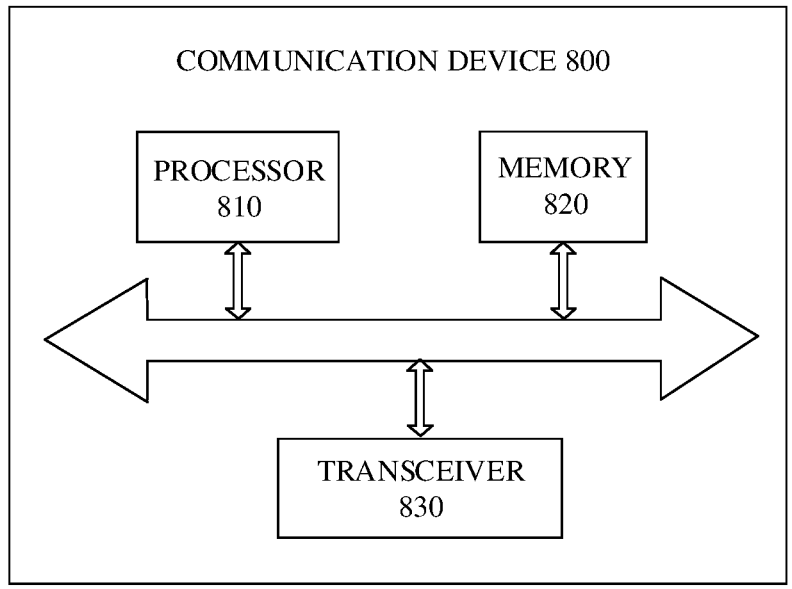
FIG. 8 is a schematic structural diagram of a communication device provided in implementations of the disclosure.

Implementations of the disclosure further provide a communication device 800. As illustrated in FIG. 8, the communication device 800 includes a processor 810 and a memory 820. The memory is configured to store computer programs. The processor is configured to invoke and execute the computer programs stored in the memory, to perform the method of implementations of the disclosure.

The processor 810 can invoke and execute the computer programs stored in the memory 820, to perform the method provided in implementations of the disclosure.

The memory 820 may be a separate device independent of the processor 810, or may be integrated into the processor 810 of the disclosure.

Optionally, as illustrated in FIG. 8, the communication device 800 can further include a transceiver 830. The processor 810 can control the transceiver 830 to communicate with other devices, for example, to send information or data to other devices, or to receive information or data from other devices.

The transceiver 830 may include a transmitter and a receiver. The transceiver 830 may further include an antenna, where one or more antenna can be provided.

Optionally, the communication device 800 may be operable as the network device of implementations of the disclosure, and the communication device 800 can implement the operations performed by the network device described in various methods of implementations of the disclosure, which will not be repeated herein for the sake of simplicity.

Optionally, the communication device 800 may be operable as the mobile terminal/the terminal device of implementations of the disclosure, and the communication device 800 can implement the operations performed by the mobile terminal/the terminal device described in various methods of implementations of the disclosure, which will not be repeated herein for the sake of simplicity.

Figure 9:
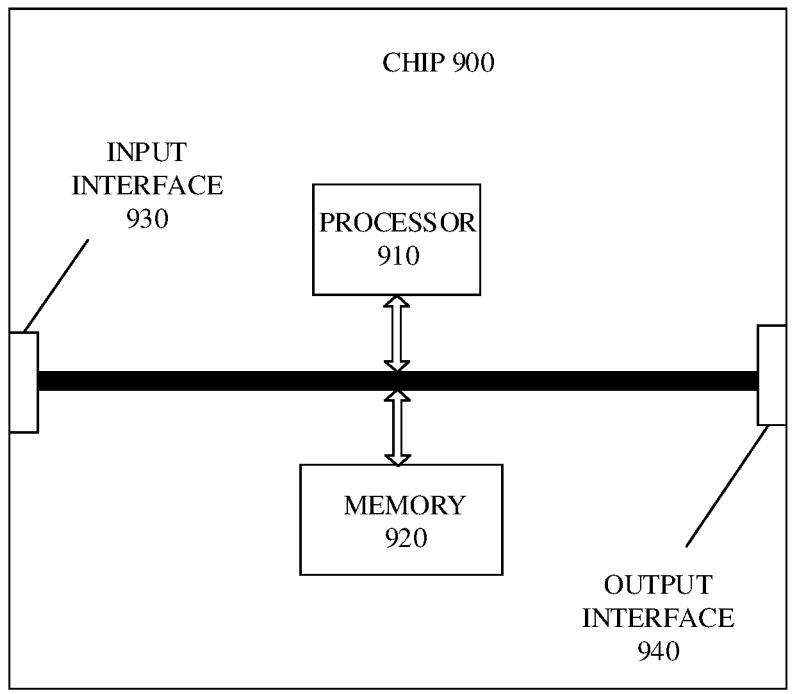
FIG. 9 is a schematic structural diagram of a chip provided in implementations of the disclosure.

FIG. 9 is a schematic structural diagram of a chip provided in implementations of the disclosure. As illustrated in FIG. 9, the chip 900 includes a processor 910. The processor 910 is configured to invoke and execute computer programs stored in a memory to perform the method provided in implementations of the disclosure.

Optionally, as illustrated in FIG. 9, the chip 900 further includes the memory 920. The processor 910 can invoke and execute the computer programs stored in the memory 920 to perform the method provided in implementations of the disclosure.

The memory 920 may be a separate device independent of the processor 910, or may be integrated into the processor 910.

Optionally, the chip 900 may further include an input interface 930. The processor 910 can control the input interface 930 to communicate with other devices or chips, for example, to acquire information or data sent by other devices or chips.

Optionally, the chip 900 may further include an output interface 940. The processor 910 can control the output interface 940 to communicate with other devices or chips, for example, to output information or data to other devices or chips.

Optionally, the chip is applicable to the network device of implementations of the disclosure. The chip can implement the operations performed by the network device described in various methods of implementations of the disclosure, which will not be repeated herein for the sake of simplicity.

Optionally, the chip is applicable to the mobile terminal/the terminal device of implementations of the disclosure. The chip can implement the operations performed by the mobile terminal/the terminal device described in various methods of implementations of the disclosure, which will not be repeated herein for the sake of simplicity.

It should be understood that, the chip referred to in implementations of the disclosure may also be referred to as a system-on-chip (SOC).

It should be understood that, the processor of implementations of the disclosure may be an integrated circuit chip with signal processing capabilities. During implementation, each step of the foregoing method may be completed by an integrated logic circuit of hardware in the processor or an instruction in the form of software. The processor may be a general-purpose processor, a digital signal processor (DSP), an application specific integrated circuit (ASIC), a field programmable gate array (FPGA), or other programmable logic devices, discrete gates or transistor logic devices, discrete hardware components. The methods, steps, and logic blocks disclosed in implementations of the disclosure can be implemented or executed. The general purpose processor may be a microprocessor, or the processor may be any conventional processor or the like. The steps of the method disclosed in implementations of the disclosure may be directly implemented as a hardware decoding processor, or may be performed by hardware and software modules in the decoding processor. The software module can be located in a storage medium such as a random access memory (RAM), a flash memory, a read only memory (ROM), a programmable ROM (PROM), or an electrically erasable programmable memory, registers, and the like. The storage medium is located in the memory. The processor reads the information in the memory, and completes the steps of the method described above with the hardware thereof.

It can be understood that, the memory according to implementations of the disclosure may be a volatile memory or a non-volatile memory, or may include both the volatile memory and the non-volatile memory. The non-volatile memory may be a ROM, a PROM, an erasable PROM (EPROM), an electrically EPROM (EEPROM), or flash memory. The volatile memory can be a RAM that acts as an external cache. By way of example but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SL-DRAM), and a direct rambus RAM (DR RAM). The memory of the systems and methods described herein is intended to include, but is not limited to, these and any other suitable types of memory.

It should be understood that, the above description of the memory is intended for illustration rather than limitation. For example, the memory of implementations may also be an SRAM, a DRAM, an SDRAM, a DDR SDRAM, an ESDRAM, an SLDRAM, a DR RAM, etc. In other words, the memory of implementations is intended to include, but is not limited to, these and any other suitable types of memory.

Figure 10:
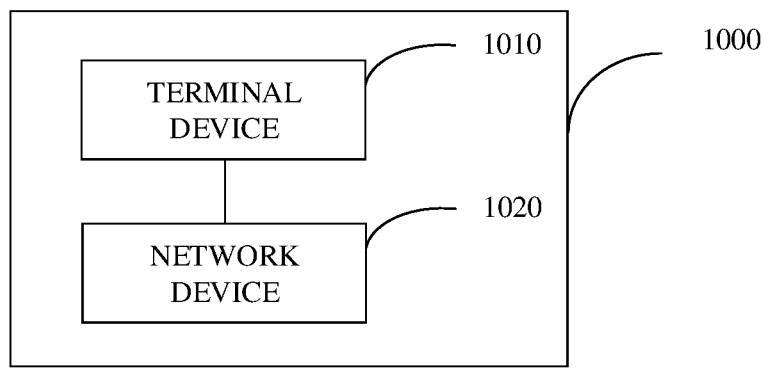
FIG. 10 is a schematic structural diagram of a communication system provided in implementations of the disclosure.

FIG. 10 is a schematic block diagram of a communication system 1000 provided in implementations of the disclosure. As illustrated in FIG. 10, the communication system 1000 includes a terminal device 1010 and a network device 1020.

The terminal device 1010 can implement functions of the terminal device described in the foregoing method implementations, and the network device 1020 can implement functions of the network device described in the foregoing method implementations, which will not be repeated herein for the sake of simplicity.

Implementations of the disclosure further provide a computer readable storage medium. The computer readable storage medium is configured to store computer programs.

Optionally, the computer readable storage medium is applicable to the network device of implementations of the disclosure. The computer programs, when executed, are operable with a computer to implement the operations performed by the network device described in various methods of implementations of the disclosure, which will not be repeated herein for the sake of simplicity.

Optionally, the computer readable storage medium is applicable to the mobile terminal/the terminal device of implementations of the disclosure. The computer programs, when executed, are operable with a computer to implement the operations performed by the mobile terminal/the terminal device described in various methods of implementations of the disclosure, which will not be repeated herein for the sake of simplicity.

Implementations of the disclosure further provide a computer program product. The computer program product includes computer program instructions.

Optionally, the computer program product is applicable to the network device of implementations of the disclosure. The computer program instructions, when executed, are operable with a computer to implement the operations performed by the network device described in various methods of implementations of the disclosure, which will not be repeated herein for the sake of simplicity.

Optionally, the computer program product is applicable to the mobile terminal/the terminal device of implementations of the disclosure. The computer program instructions, when executed, are operable with a computer to implement the operations performed by the mobile terminal/the terminal device described in various methods of implementations of the disclosure, which will not be repeated herein for the sake of simplicity.

Implementations of the disclosure further provide a computer program.

Optionally, the computer program is applicable to the network device of implementations of the disclosure. The computer program, when executed by a computer, is operable with the computer to implement the operations performed by the network device described in various methods of implementations of the disclosure, which will not be repeated herein for the sake of simplicity.

Optionally, the computer program is applicable to the mobile terminal/the terminal device of implementations of the disclosure. The computer program, when executed by a computer, is operable with the computer to implement the operations performed by the mobile terminal/the terminal device described in various methods of implementations of the disclosure, which will not be repeated herein for the sake of simplicity.

Those of ordinary skill in the art will appreciate that units and algorithmic operations of various examples described in connection with implementations of the disclosure can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and simplicity, in terms of the working processes of the foregoing systems, apparatuses, and units, reference can be made to the corresponding processes of the above method implementations, which will not be repeated herein.

It will be appreciated that the systems, apparatuses, and methods disclosed in implementations of the disclosure may also be implemented in various other manners. For example, the above apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device or unit, and may be electrical, mechanical, or otherwise.

Separated units as illustrated may or may not be physically separated. Components displayed as units may or may not be physical units, and may reside at one location or may be distributed to multiple networked units. Some or all of the units may be selectively adopted according to practical needs to achieve desired objectives of the disclosure.

In addition, various functional units described in various implementations of the disclosure may be integrated into one processing unit or may be present as a number of physically separated units, and two or more units may be integrated into one.

If the functional units are implemented as software functional units and sold or used as standalone products, they may be stored in a computer readable storage medium. Based on such an understanding, the essential technical solution, or the portion that contributes to the prior art, or part of the technical solution of the disclosure may be embodied as software products. The computer software products can be stored in a storage medium and may include multiple instructions that, when executed, can cause a computing device, e.g., a personal computer, a server, a network device, etc., to execute some or all operations of the methods described in various implementations of the disclosure. The above storage medium may include various kinds of media that can store program codes, such as a universal serial bus (USB) flash disk, a mobile hard drive, a ROM, a RAM, a magnetic disk, or an optical disk.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method of wireless communication, performed by a network device and comprising:
   transmitting, by the network device, first information to a terminal device, wherein the first information is used for indicating a physical uplink control channel (PUCCH) resource configured in a first slot, the first slot comprises a plurality of sub-slots, and the first information comprises a starting offset of the PUCCH resource relative to a boundary of at least one sub-slot among the plurality of sub-slots, wherein a starting offset of a PUCCH resource in at least one sub-slot among the plurality of sub-slots is smaller than or equal to a number of symbols comprised in one sub-slot among the plurality of sub-slots, wherein each sub-slot among the plurality of sub-slots has the same number of symbols.

2. The method of claim 1, wherein the first information further comprises at least one of:
   information of the at least one sub-slot among the plurality of sub-slots, a length of the PUCCH resource, a starting symbol offset or starting symbol index of the PUCCH resource, a configuration of the first slot, or restriction information.

3. The method of claim 2, wherein the information of the at least one sub-slot comprises a position of a boundary of the at least one sub-slot.

4. The method of claim 3, wherein the position of a boundary of the at least one sub-slot comprises a position of at least one of a lower boundary or a position of a starting boundary of the at least one sub-slot.

5. The method of claim 1, wherein:
   a length of the PUCCH resource in the at least one sub-slot among the plurality of sub-slots is smaller than or equal to a length of the first slot.

6. The method of claim 1, wherein the PUCCH resource in the at least one sub-slot among the plurality of sub-slots comprises a PUCCH time-domain resource in the at least one sub-slot.

7. A method of wireless communication, performed by a terminal device and the method comprising:
   receiving, by the terminal device, first information transmitted by a network device, wherein the first information is used for indicating at least one physical uplink control channel (PUCCH) resource configured in a first slot, the first slot comprises a plurality of sub-slots, and the first information comprises a starting offset of the PUCCH resource relative to a boundary of at least one sub-slot among the plurality of sub-slots; and
   determining, by the terminal device, a PUCCH resource in at least one sub-slot among the plurality of sub-slots from the at least one PUCCH resource according to the first information;
   wherein a starting offset of a PUCCH resource in the at least one sub-slot is smaller than or equal to a number of symbols comprised in one sub-slot among the plurality of sub-slots, wherein each sub-slot among the plurality of sub-slots has the same number of symbols.

8. The method of claim 7, wherein the first information further comprises at least one of:
   information of the at least one sub-slot, a length of the PUCCH resource, a starting symbol offset or starting symbol index of the PUCCH resource, a configuration of the first slot, or restriction information.

9. The method of claim 8, wherein the information of the at least one sub-slot comprises a position of a boundary of the at least one sub-slot.

10. The method of claim 9, wherein the position of a boundary of the at least one sub-slot comprises a position of at least one of a lower boundary or a position of a starting boundary of the at least one sub-slot.

11. The method of claim 7, wherein:
    a length of the PUCCH resource in the at least one sub-slot is smaller than or equal to a length of the first slot.

12. The method of claim 7, wherein the PUCCH resource in the at least one sub-slot comprises a PUCCH time-domain resource in the at least one sub-slot.

13. An apparatus of wireless communication, comprising:
    a transceiver;
    a processor; and
    a memory storing computer programs which, when executed by the processor, are operable with the transceiver to:
      receive first information transmitted by a network device, wherein the first information is used for indicating at least one physical uplink control channel (PUCCH) resource configured in a first slot, the first slot comprises a plurality of sub-slots, and the first information comprises a starting offset of a PUCCH resource relative to a boundary of at least one sub-slot among the plurality of sub-slots; and
      the computer programs, when executed by the processor, are operable with the processor to determine a PUCCH resource in at least one sub-slot among the plurality of sub-slots from the at least one PUCCH resource according to the first information;
    wherein a starting offset of a PUCCH resource in the at least one sub-slot is smaller than or equal to a number of symbols comprised in one sub-slot among the plurality of sub-slots, wherein each sub-slot among the plurality of sub-slots has the same number of symbols.

14. The apparatus of claim 13, wherein the first information further comprises at least one of:
    information of the at least one sub-slot, a length of the PUCCH resource, a starting symbol offset or starting symbol index of the PUCCH resource, a configuration of the first slot, or restriction information.

15. The apparatus of claim 14, wherein the information of the at least one sub-slot comprises a position of a boundary of the at least one sub-slot.

16. The apparatus of claim 15, wherein the position of a boundary of the at least one sub-slot comprises a position of at least one of a lower boundary or a position of a starting boundary of the at least one sub-slot.

17. The apparatus of claim 13, wherein:
a length of the PUCCH resource in the at least one sub-slot is smaller than or equal to a length of the first slot.

\* \* \* \* \*